(12) United States Patent
Miki et al.

(10) Patent No.: US 7,994,229 B2
(45) Date of Patent: Aug. 9, 2011

(54) THERMO-EXPANSIVE MICROSPHERES, THEIR PRODUCTION PROCESS AND THEIR APPLICATION

(75) Inventors: Katsushi Miki, Yao (JP); Toshiaki Masuda, Yao (JP); Ichiro Takahara, Yao (JP); Takashi Fujie, Yao (JP); Ikuo Yosejima, Yao (JP)

(73) Assignee: Matsumoto Yushi-Seiyaku Co., Ltd., Yao-shi (JP)

( * ) Notice: Subject to any disclaimer, the term of this patent is extended or adjusted under 35 U.S.C. 154(b) by 378 days.

(21) Appl. No.: 12/068,430

(22) Filed: Feb. 6, 2008

(65) Prior Publication Data

US 2008/0293838 A1 Nov. 27, 2008

Related U.S. Application Data

(60) Division of application No. 10/954,212, filed on Oct. 1, 2004, now Pat. No. 7,351,752, which is a continuation-in-part of application No. PCT/JP2004/002053, filed on Feb. 23, 2004.

(30) Foreign Application Priority Data

Feb. 24, 2003 (JP) .................................. 2003-096568

(51) Int. Cl.
*C08J 9/32* (2006.01)
(52) U.S. Cl. ................. 521/56; 521/57; 521/76; 521/88; 521/142; 521/146
(58) Field of Classification Search .................... 521/56, 521/57, 76, 88, 142, 146
See application file for complete search history.

(56) References Cited

U.S. PATENT DOCUMENTS

| | | | |
|---|---|---|---|
| 3,615,972 A | 10/1971 | Morehouse, Jr. et al. |
| 5,834,526 A | 11/1998 | Wu et al. |
| 6,106,946 A | 8/2000 | Tanaka et al. |
| 6,225,361 B1 | 5/2001 | Nakajima |
| 6,613,810 B1 | 9/2003 | Ejiri et al. |
| 2003/0114546 A1 | 6/2003 | Satake et al. |

FOREIGN PATENT DOCUMENTS

| | | |
|---|---|---|
| EP | 0 559 254 A1 | 9/1993 |
| EP | 1 288 272 A1 | 3/2003 |
| JP | 42-26524 B | 12/1967 |
| JP | 6-49260 A1 | 2/1994 |
| JP | 11-269343 A1 | 10/1999 |
| JP | 2002-12693 A | 1/2002 |
| JP | 2002-511900 A | 4/2002 |
| KR | 1991-0001927 | 3/1991 |
| WO | WO 88/06916 | 9/1988 |
| WO | WO-99/37706 A1 | 7/1999 |
| WO | WO-01/83636 A1 | 11/2001 |
| WO | WO-02/096635 A1 | 12/2002 |
| WO | WO-03/099955 A1 | 12/2003 |

OTHER PUBLICATIONS

Office Action issued in corresponding Korean application No. 10-2004-7014616 dated Jan. 20, 2010.

*Primary Examiner* — Irina S Zemel
(74) *Attorney, Agent, or Firm* — Birch, Stewart, Kolasch & Birch, LLP

(57) ABSTRACT

The present invention provides a process for producing thermo-expansive microspheres comprising a thermoplastic resinous shell and a blowing agent being encapsulated in the shell, the blowing agent which is a fluorine-containing $C_{2-10}$ compound having ether linkage, being free of chlorine and bromine atoms and gasifying at a temperature not higher than the softening point of the thermoplastic resin. The thermo-expansive microspheres have preferably an average particle size ranging from 1 to 100 μm and a CV, or coefficient of variation, of particle size distribution being 30% or less, and a retaining ratio of blowing agent encapsulated being 90% or more.

15 Claims, No Drawings

THERMO-EXPANSIVE MICROSPHERES, THEIR PRODUCTION PROCESS AND THEIR APPLICATION

This application is a Divisional Application of application Ser. No. 10/954,212 filed on Oct. 1, 2004 now U.S. Pat. No. 7,351,752 which is a Continuation-In-Part of copending Application No. PCT/JP04/002053 filed on Feb. 23, 2004, the entire contents of which are hereby incorporated by reference and for which priority is claimed under 35 U.S.C. §120. This application also claims priority under 35 U.S.C. §119(a) on Patent Application No. 2003-96568 filed in Japan on Feb. 24, 2003. The entire contents of each of the above documents is hereby incorporated by reference.

FIELD OF THE INVENTION

The present invention relates to thermo-expansive microspheres comprising thermoplastic resinous shell and a blowing agent encapsulated in the shell, especially to those having superior flame retardant or flame resistant performance and particle sizes distributing in a narrow range; and the production process and application thereof.

BACKGROUND OF THE INVENTION

Thermo-expansive microspheres comprising thermoplastic resinous shell and a blowing agent encapsulated in the shell are generally called thermo-expansive microcapsules. Various processes for producing thermo-expansive microcapsules have been studied. Japanese Patent Publication Sho 42-26524 describes a general process for producing thermo-expansive microcapsules. U.S. Pat. No. 3,615,972 describes a production process of thermo-expansive microspheres having polymeric shell formed into uniform thickness.

For producing thermo-expansive microcapsules, hydrocarbons, for example, n-butane, isobutane, isopentane and neopentane, are usually applied. Above all, isobutane and isopentane, which impart superior expanding performance to thermo-expansive microcapsules, are used.

MATSUMOTO MICROSPHERE (produced by Matsumoto Yushi-Seiyaku Co., Ltd.), a commercially available product of thermo-expansive microcapsules, comprises thermoplastic resin, such as vinylidene chloride polymer, acrylonitrile copolymer and acrylic polymer, in which blowing agents, such as isobutane and isopentane, are encapsulated.

Thermo-expansive microcapsules comprising polymers containing a considerable amount of chloride are flame-retardant even they contain flammable gases. However, they are hazardous because they generate chloride and hydrogen chloride gases, and further generate phosgene when they are ignited.

Employing a blowing agent other than flammable hydrocarbons for imparting flame resistance to thermo-expansive microcapsules has already been proposed. U.S. Pat. No. 3,615,972 discloses certain chlorofluorocarbons applicable for the purpose, though they have not been applied in commercial production. Chlorofluorocarbons do not impart sufficient expanding performance to thermo-expansive microcapsules, and they have other shortages.

Flon has also been applied for various flame-resistant products owing to its unique property. Although flon gas was admitted to be inert and have been used for a long time, recently, as popularly known, the use of flon gas has been restricted since the depletion of ozone shield became a serious problem, and applicable fluoro-compounds are being reexamined.

Actually, chlorofluorocarbon has been replaced by chloride-free aliphatic fluorocarbons or fluorohydrocarbons. Microcapsules produced of those chloride-free fluoro-compounds are disclosed in Japanese Patent Laid Open Hei 6-49260.

Aliphatic fluorocarbons or fluorohydrocarbons are inert indeed and have low ozone-depleting potential. However, they cannot be applied for producing thermo-expansive microspheres in the form of mixture with hydrocarbons of sufficient quantity for imparting high expanding performance to thermo-expansive microspheres, because their molecules, in which hydrogen of hydrocarbon moieties was only substituted with fluorine, have poor polarity and compatibility to hydrocarbons. Application of only one aliphatic fluorocarbon or fluorohydrocarbon causes a serious problem, i.e., insufficient expanding performance of resultant microspheres, because such fluorocarbon cannot be completely encapsulated in thermoplastic resinous shell in polymerization reaction due to their poor compatibility to monomers, and results in the formation of microspheres having thermo-plastic resinous shell impregnated with the fluorocarbon.

PCT International Application nationalized and published in Japan No. 2002-511900 discloses thermo-expansive hollow particles, being filled with an expanding agent of a mixture of (a) fluoro-hydrocarbon fluid and (b) organic ester, ether or ketone. Although fluoro-hydrocarbon fluids, such as aliphatic fluorocarbons or fluorohydrocarbons, are inert and have low ozone-depleting potential as described above, they are not preferable because of their high global warming potential. Aliphatic fluorocarbons or fluorohydrocarbons with low fluorine-substitution degree are not preferable, even if they are compatible to monomers, because resultant thermo-expansive hollow particles exhibit flammability. The particle sizes of the thermo-expansive hollow particles produced of those fluorine compounds distribute in a broad range, for example, a distribution range with a CV or coefficient of variation greater than 30%, which causes difficulty in providing products of constant expanding performance.

In the examples 11 and 12 of the nationalized and published patent application, thermo-expansive hollow particles produced of (a) fluorohydrocarbon fluid, such as the mixture of 1,1,1,2,3,4,4,5,5,5-decafluoropentane and perfluorohexane (PF-5060), and (b) one of organic esters, ethers and ketones, such as dimethyl hexafluoroglutarate and dimethyl octafluoroadipate are described as examples. The hollow particles have low expanding capacity and their particle size distributes in a broad range.

With those reasons, expansive microcapsules are not commercially and popularly available at present.

SUMMARY OF THE INVENTION

The object of the present invention is to provide thermo-expansive microspheres having low environmental loading, superior flame-resistant or flame-retardant performance, and particle sizes distributing in a narrow range.

Another object of the present invention is to provide expanded hollow microspheres having particle sizes distributing in a narrow range and a low specific gravity.

Further object of the present invention is to provide thermo-expansive microspheres and expanded hollow microspheres applicable to flame-retardant or flame-resistant thermo-insulating materials, flame-retardant or flame-resistant light-weight fillers, and flame-retardant or flame-resistant light-weight molded products.

Further object of the present invention is to provide a production process of the thermo-expansive microspheres of the present invention, which have the performances mentioned above.

Further object of the present invention is to provide compositions containing the thermo-expansive microspheres or expanded hollow microspheres of the present invention.

Further object and advantages of the present invention are clearly illustrated in the following description.

According to the present invention, the objects and advantages of the present invention described above are attained, first, with thermo-expansive microspheres, which are characterized by thermoplastic resinous shell and a blowing agent encapsulated in the shell, wherein the blowing agent is a fluorine-containing $C_{2-10}$ compound having ether linkage and containing no chlorine and bromine atoms, and gasifies at a temperature below the softening point of the thermoplastic resin.

According to the present invention, the objects and advantages of the present invention described above are attained, second, with expanded hollow microspheres, which are characterized by their production process wherein thermo-expansive microspheres of the present invention are heated at a temperature above the softening point of the thermoplastic resinous shell to be expanded into a volume of 10 or more of expansion ratio and produced into expanded microspheres having a true specific gravity of 0.1 or less and a particle size distribution with a coefficient of variation of 30% or less.

According to the present invention, the objects and advantages of the present invention described above are attained, third, with the production process of thermo-expansive microspheres, which are characterized by polymerizing at least one polymerizable monomer in an aqueous dispersion in the presence of a blowing agent to produce thermo-expansive microspheres, wherein the blowing agent is a fluorine-containing $C_{2-10}$ compound having ether structure and containing no chlorine and bromine atoms.

DETAILED DESCRIPTION OF THE INVENTION

The thermo-expansive microspheres of the present invention contain a fluorine-containing $C_{2-10}$, preferably $C_{2-8}$, compound having ether linkage and containing no chlorine and bromine atoms as a blowing agent. Fluorine-containing compounds gasifying at a temperature below the softening point of the thermoplastic resinous shell of thermo-expansive microspheres are preferable. For example, hydrofluoroethers, such as $C_3F_7OCH_3$, $C_4F_9OCH_3$, $C_4F_9OC_2H_5$, and $C_7F_{15}OC_2H_5$, are preferable, though the blowing agents are not restricted within the scope of those examples. The alkyl groups in said hydrofluoroether may be either linear or branched. The preferable amount of said blowing agent ranges from 2 to 85 weight percent of thermo-expansive microspheres, more preferably from 15 to 60 weight percent, and the most preferably from 30 to 50 weight percent.

Said blowing agents can also be composed by blending fluorine compounds having ether linkage with substances which are usually applied as blowing agents and gasify at a temperature below the softening point of the thermoplastic resinous shell of thermo-expansive microspheres, in addition to composing the blowing agents only with fluorine compounds having ether linkage.

The examples of those substances are halogenides of propane, propylene, butene, normal butane, isobutane, isopentane, neopentane, normal pentane, normal hexane, isohexane, heptane, octane, petroleum ether and methane; low-boiling-point fluids, such as tetraalkyl silane; and azodicarbonamide, which thermally decomposes and gasifies. Those compounds are selected according to a temperature range where thermo-expansive microspheres are intended to be expanded. For reflecting the property of fluorine compounds to the property of thermo-expansive microspheres, it is preferable to control the ratio of the components other than fluorine-containing compounds in a blowing agent into 50 weight percent or less, more preferably 20 weight percent or less, of the whole of a blowing agent. Greater ratio of fluorine-containing compounds having ether linkage in the whole of a blowing agent results in higher reflection of the property of fluorine-containing compounds to the property of thermo-expansive microspheres, and thus enables to provide thermo-expansive microspheres having flame-retardant and flame-resistant performance, and to attain higher retaining ratio of an encapsulated blowing agent before and after thermal expansion of microspheres as describer later.

The thermoplastic resins for forming the shell of the thermo-expansive microspheres of the present invention comprise a polymer of a radically polymerizable monomer or a mixture thereof. The examples of those monomers are nitrile monomers, such as acrylonitrile, methacrylonitrile, α-chloro acrylonitrile, α-ethoxy acrylonitrile, and fumaronitrile; monomers containing carboxyl groups, such as acrylic acid, methacrylic acid, itaconic acid, maleic acid, fumaric acid, and citraconic acid; vinylidene chloride; vinyl acetate; (meth)acrylates, such as methyl(meth)acrylate, ethyl (meth) acrylate, n-butyl(meth)acrylate, isobutyl (meth)acrylate, t-butyl(meth)acrylate, isobornyl (meth)acrylate, cyclohexyl (meth)acrylate, benzyl (meth)acrylate, and β-carboxyethyl acrylate; styrene monomers, such as styrene, α-methyl styrene, and chlorostyrene; amide monomers, such as acrylamide, substituted acrylamide, methacrylamide, and substituted methacrylamide; and an optional mixture thereof. Thermo-expansive microspheres with superior heat resistance are those having thermoplastic resinous shell produced of nitrile monomers, and the mixture of acrylonitrile and methacrylonitrile is preferable for the purpose. The preferable ratio of nitrile monomers in thermoplastic resinous shell is 80 weight percent or more, more preferably 90 weight percent or more. Thermoplastic resinous shell comprising less than 80 weight percent of nitrile monomers is not preferable for heat-resistant thermo-expansive microspheres.

The examples of cross-linking agents or polymerizable monomers having two or more of polymerizable double bonds to be added to said monomers within the scope of the present invention are, for example, aromatic divinyl compounds, such as divinyl benzene and divinyl naphthalene, aryl methacrylate, triacrylformal, triallyl isocyanate, ethylene glycol di(meth)acrylate, diethylene glycol di(meth)acrylate, triethylene glycol di(meth)acrylate, 1,4-butanediol di(meth) acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,4-butanediol dimethacrylate, 1,6-hexanediol di(meth)acrylate, 1,9-nonanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydroxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate, and the mixture thereof. The amount of those cross-linking agents ranges preferably from 0.01 to 5 weight percent, more preferably from 0.05 to 3 weight percent of the whole of compounds to be polymerized. An amount less than 0.01 weight percent results in low degree of cross-linking leading to poor retention of encapsulated blowing agent and poor heat resistance of resultant microspheres. An amount greater than 5 weight results in excessive degree of cross-linking which extremely deteriorates the expanding performance of microspheres.

Shell materials of thermo-expansive microspheres are prepared by adding proper polymerization initiators to the components described above. Polymerization initiators known to those skilled in the art, such as peroxides and azo compounds, can be employed. The examples of peroxides are azobisisobutyronitrile, benzoyl peroxide, lauryl peroxide, diisopropyl peroxidicarbonate, and t-butyl peroxide, and the examples of azo compounds are 2,2'-azobis(4-methoxy-2,4-dimethyl valeronitrile), 2,2'-azobis isobutyronitrile, 2,2'-azobis(2,4-dimethyl valeronitrile), 2,2'-azobis(2-methyl propionate), and 2,2'-azobis(2-methyl butyronitrile). Preferable polymerization initiators are oil-soluble initiators which are soluble in polymerizable monomers employed.

For producing thermo-expansive microspheres, conventional processes for producing thermo-expansive microcapsules are usually employed. In those processes, inorganic microparticles such as colloidal silica, colloidal calcium carbonate, magnesium hydroxide, calcium phosphate, aluminum hydroxide and alumina, are employed as the stabilizers for aqueous dispersion. In addition, polymeric dispersion stabilizers, such as the condensation products of diethanolamine and aliphatic dicarboxylic acid, polyvinyl pyrolidone, methyl cellulose, polyethylene oxide and polyvinyl alcohol; and various emulsifiers including cationic surfactants, such as alkyltrimethyl ammonium chloride and dialkyldimethylammonium chloride, anionic surfactants, such as sodium alkyl sulfate, and amphoteric surfactants, such as alkyldimethyl aminoacetic acid betaine and alkyldihydroxyethyl aminoacetic acid betaine are employed as dispersion stabilizers.

The preferable thermo-expansive microspheres of the present invention have average particle sizes ranging from 1 to 100 μm and particle size distribution with 30% or less of coefficient of variation, CV. The average particle size of the thermo-expansive microspheres of the present invention can be controlled over broad range and designed freely according to their end uses. The coefficient of variation, CV, is calculated by the following formula:

$$CV=(S/<X>)\times 100(\%) \quad (1)$$

$$S=\{\Sigma^n_{i=1}(Xi-<X>)^2/(n-1)\}^{1/2} \quad (2)$$

where S is the standard deviation of particle size, $<X>$ is an average particle size, $Xi$ is the size of a particle of the i-th order, and n is the number of particles.

For producing expanded hollow microspheres from the thermo-expansive microspheres of the present invention, it is preferable to heat the microspheres at a temperature higher than the softening point of the thermoplastic resin of the shell to expand the microspheres into a volume with an expansion ratio of 10 or more. With this treatment, expanded microspheres having a specific gravity of 0.1 or lower and particle size distribution with 30% or lower coefficient of variation, CV, are produced. Particle size distribution with a coefficient of variation or CV greater than 30% is not preferable, because it may result in variable expanding performance of thermo-expansive microspheres. In addition, thermo-expansive microspheres with excessively varied particle sizes will adversely affect on the surface finish of products in which the thermo-expansive microspheres are blended or mixed.

The average particle sizes of the thermo-expansive microspheres and expanded hollow microspheres of the present invention were determined by a laser diffraction particle size distribution tester (Heros & Rodos, manufactured by Sympatec Co., Ltd.).

The true specific gravity of the thermo-expansive microspheres of the present invention was determined by a liquid substitution method with isopropyl alcohol.

The expansion ratio of said thermo-expansive microspheres was determined by dividing the true specific gravity of unexpanded thermo-expansive microspheres with the true specific gravity of expanded hollow microspheres, which was expanded by heating thermo-expansive microspheres in a Perfect Oven manufactured by Tabai Espec Co., Ltd. at a predetermined temperature (expanding temperature) for two minutes.

A fine-particle coating agent for the thermo-expansive microspheres of the present invention having smaller particle sizes than that of the thermo-expansive microspheres, preferably smaller than one tenth of the particle size of the thermo-expansive microspheres, are selected among organic coating agents or inorganic coating agents according to the purpose of their application, such as improving dispersibility in materials or flowability of said microspheres, and preventing the fusion of said microspheres in heating and expanding. The preferable ratio of said fine-particle coating agent adsorbed to thermo-expansive microspheres ranges from 0.1 to 95 weight percent, more preferably from 0.5 to 60 weight percent, and most preferably from 5 to 50 weight percent. A ratio beyond the range is not preferable, because a ratio lower than 0.1 weight percent cannot attain said property, and a ratio greater than 95 weight percent increases the true specific gravity of microspheres beyond a preferable range.

The examples of the organic coating agent are metal soaps, such as magnesium stearate, calcium stearate, zinc stearate, barium stearate, and lithium stearate; resin powders, such as polytetrafluoroethylene beads and polymethyl methacrylate beads; and polyamide fiber.

The examples of the inorganic coating agent are silica, alumina, mica, talc, isinglass, calcium carbonate, calcium hydroxide, calcium phosphate, magnesium hydroxide, magnesium phosphate, barium sulfate, titanium dioxide, zinc oxide, ceramic beads, glass beads, crystal beads, carbon black, and molybdenum disulfide. Those organic or inorganic coating agents can be used in a form of mixture.

For preventing the fusion of microspheres mentioned above, an organic compound having a melting point of 90° C. or higher, preferably 130° C. or higher, or an inorganic compound of which crystal is formed into layer lattice is preferable.

Ordinary powder mixers, which can oscillate and agitate powder, can be employed for mixing thermo-expansive microspheres and a fine-particle coating agent. Specifically, powder mixers which can oscillate and agitate or agitate powder, such as ribbon-type mixers and vertical screw mixers, can be employed. Recently, highly efficient multi-functional powder mixers manufactured by combining several agitation devices, such as Super Mixer (manufactured by Kawata MFG Co., Ltd.), High-Speed Mixer (manufactured by Fukae Co., Ltd.) and New-Gra Machine (manufactured by Seishin Enterprise Co., Ltd.), have been introduced and thus they are employable. In addition, a simple device consisting of a vessel and paddle blades is applicable.

Said fine-particle coating agent sticks on the surface of thermo-expansive microspheres.

The thermo-expansive microspheres of the present invention can be processed into lightweight foamed compositions by blending them with resins, such as rubber, thermoplastic resins, and thermo-setting resins, and by heating.

Expanded hollow microspheres produced from the thermoplastic microspheres of the present invention can be processed into lightweight resin compositions by blending them with resins, such as rubber, thermoplastic resins, and thermo-setting resins. The examples of applicable resins are SBS (styrene-butadiene-styrene block copolymer), PVC (polyvinyl chloride), PP (polypropylene), PE (polyethylene), PU (polyurethane), PS (polystyrene), natural rubber, acrylic resin, epoxy resin, and silicone resin, though the applicable resins are not restricted within the scope of those examples.

The preferable ratio of thermo-expansive microspheres and expanded hollow microspheres in a resultant composition ranges from 0.5 to 50 weight percent, more preferably from 1.0 to 30 weight percent.

The advantages of the thermo-expansive microspheres of the present invention are processability into expanded hollow microspheres with almost no emission of fluorine-containing compounds; much narrower particle size distribution range than the ranges of other thermo-expansive microspheres in which aliphatic fluorocarbons or fluoro hydrocarbons are encapsulated; and superior expanding performance. Another advantage of the thermo-expansive microspheres in which such blowing agents are encapsulated is their applicability as flame-retardant or flame-resistant materials having low environmental loading.

The retaining ratio, or percent, of a blowing agent encapsulated in thermo-expansive microspheres is defined as $G_2/G_1 \times 100$; where $G_1$ is the weight of a blowing agent encapsulated in thermo-expansive microspheres before expansion and $G_2$ is the weight of a blowing agent encapsulated in thermo-expansive microspheres after expansion. A fluorine compound having ether linkage is encapsulated as a blowing agent in the thermo-expansive microspheres of the present invention, and the retaining ratio of the blowing agent should be 90 percent or more, preferably 95 percent or more, more preferably 97 percent or more. A retaining ratio lower than 90 percent may cause uneven property of expanded microspheres because considerable ratio of a blowing agent is released through shell polymer in thermo-expanding process of thermo-expansive microspheres. In addition, it gives adverse effect on the stability of expanded microspheres during storage.

The thermo-expansive microspheres and expanded hollow microspheres of the present invention are applicable to various end uses. Unexpanded thermo-expansive microspheres are applied as the fillers of automobile paints and the foaming agents of foaming inks to be applied to wall papers and decoration for apparels owing to their thermo-expansive performance. Furthermore, unexpanded thermo-expansive microspheres can be used as foaming agents for imparting lightweight, porous, cushioning and thermo-insulating property in a process where the microspheres are blended with thermoplastic resins or thermo-setting resins and heated to expand the microspheres at a temperature higher than a point at which the microspheres start to expand.

Expanded thermo-expansive microspheres can be applied as lightweight fillers for paints, putty, composite materials, paper, and insulating materials, and as volume-retaining materials for pressure vessels, owing to their low density and filling effect. As described above, the thermo-expansive microspheres of the present invention can be applied to the same end uses as those for conventional thermo-expansive microspheres.

Further, the present invention can be applied to flame-resistant paints and insulating materials. In flame-resistant paints, the above-mentioned thermo-expansive microspheres can be used as flame-retardant or flame-resistant fillers.

EXAMPLES

The present invention is described precisely with the following examples and comparative examples.

Example 1

A water phase was prepared by adding 150 g of salt, 3.0 g of an adipic acid-diethanolamine condensate, and 20 g of colloidal silica (20% concentration) in 500 g of deionized water and by homogenizing the mixture with agitation.

An oil phase was prepared by mixing 200 g of acrylonitrile, 70 g of methacrylonitrile, 5.0 g of methyl methacrylate, 1.2 g of ethylene glycol dimethacrylate, 2.0 g of azobisisobutyronitrile, and 150 g of methylperfluorobutyl ether, and by dissolving the components with agitation.

Then the water phase and oil phase were mixed preliminarily with a homogenizer at 3,000 rpm for 2 minutes, and then agitated at 10,000 rpm for 2 minutes to be prepared into suspension. Then the suspension was transferred in a reactor, purged with nitrogen, and reacted at 61° C. for 20 hours under agitation. The reaction product was filtered and dried. The resultant microspheres had an average particle size of 30 μm with CV or coefficient of variation of 27%. The true specific gravity of the thermo-expansive microspheres was determined to be 1.23. The ratio of the blowing agent encapsulated in the thermo-expansive microspheres was determined to be 33.8 weight percent. The microspheres did not burn when a source of ignition, flame from a lighter, was brought close to them. The angle of repose of the microspheres, which indicates the degree of flowability of powder, was determined with a Powder Tester (PT-N, manufactured by Hosokawa Micron Corporation), and the result was 43 degrees.

The resultant thermo-expansive microspheres were heated at 160° C. for 2 minutes to be processed into expanded hollow microspheres. The expanded hollow microspheres had an average particle size of 120 μm with CV or coefficient of variation of 27%. The true specific gravity of the microspheres was 0.020, with an expansion ratio of 61. Subsequently the ratio of the blowing agent encapsulated in the expanded hollow microspheres was determined to be 33.2 weight percent. The expanded hollow microspheres did not burn when a source of ignition was brought close to them.

Example 2

The thermo-expansive microspheres produced in Example 1 and titanium dioxide, having an average particle size of 15 nm, were mixed in 6:4 weight ratio and agitated uniformly with a Super Mixer (manufactured by Kawata MFG Co., Ltd.) to produce thermo-expansive microspheres having a surface coated with titanium dioxide. Their average particle size was 30 μm with CV or coefficient of variation of 27%. The angle of repose of the microspheres was determined to be 0 degree, exhibiting excellent flowability.

Example 3

Thermo-expansive microspheres were produced in the same manner as in Example 1 except that an inline homogenizer was employed instead of the homogenizer employed in Example. The resultant thermo-expansive microspheres had an average particle size of 31 μm with CV or coefficient of variation of 15% and a true specific gravity of 1.20, and the ratio of the blowing agent was 33.2 weight percent. The thermo-expansive microspheres did not burn when a source of ignition was brought close to them.

The microspheres were heated at 160° C. for 2 minutes in the same manner as in Example 1 to be processed into expanded hollow microspheres. The expanded hollow microspheres had an average particle size of 120 μm with CV or coefficient of variation of 16%, a true specific gravity of 0.021, and an expansion ratio of 57.

Subsequently the ratio of the blowing agent encapsulated in the expanded hollow microspheres was determined to be 31.9 weight percent. The expanded hollow microspheres did not burn when a source of ignition was brought close to them.

Comparative Example 1

Thermo-expansive microspheres were produced in the same manner as in Example 1 except that 150 g of methylperfluorobutyl ether was replaced by 65 g of isohexane.

The resultant thermo-expansive microspheres had an average particle size of 31 μm with CV or coefficient of variation of 44% and a true specific gravity of 1.02, and the ratio of the blowing agent was 17.5 weight percent. The thermo-expansive microspheres inflamed when a source of ignition was brought close to them.

The microspheres were heated at 160° C. for 2 minutes in the same manner as in Example 1 to be processed into expanded hollow microspheres. The expanded hollow microspheres had an average particle size of 110 μm with CV or coefficient of variation of 42%, a true specific gravity of 0.019, and an expansion ratio of 53.

Subsequently the ratio of the blowing agent encapsulated in the expanded hollow microspheres was determined to be 14.6 weight percent. The expanded hollow microspheres inflamed when a source of ignition was brought close to them.

Comparative Example 2

Thermo-expansive microspheres were produced in the same manner as in Example 1 except that 150 g of methylperfluorobutyl ether was replaced by 161.5 g of perfluorocarbon ($C_6F_{14}$).

The resultant thermo-expansive microspheres had an average particle size of 30 μm with CV or coefficient of variation of 45% and a true specific gravity of 1.20, and the ratio of the blowing agent was 27.5 weight percent. The thermo-expansive microspheres did not burn when a source of ignition was brought close to them.

The microspheres were heated at 160° C. for 2 minutes in the same manner as in Example 1 to be processed into expanded hollow microspheres. The expanded hollow microspheres had an average particle size of 110 μm with CV or coefficient of variation of 46%, a true specific gravity of 0.028, and an expansion ratio of 43.

Subsequently the ratio of the blowing agent encapsulated in the expanded hollow microspheres was determined to be 24.3 weight percent. The expanded hollow microspheres did not burn when a source of ignition was brought close to them.

Comparative Example 3

Thermo-expansive microspheres were produced in the same manner as in Comparative Example 2 except that 7.0 g of dimethyl adipate was added to the oil phase.

The resultant thermo-expansive microspheres had an average particle size of 21 μm with CV or coefficient of variation of 48% and a true specific gravity of 1.19, and the ratio of the blowing agent was 20.5 weight percent. The thermo-expansive microspheres did not burn when a source of ignition was brought close to them.

The microspheres were heated at 160° C. for 2 minutes in the same manner as in Example 1 to be processed into expanded hollow microspheres. The expanded hollow microspheres had an average particle size of 70 μm with CV or coefficient of variation of 48%, a true specific gravity of 0.032, and an expansion ratio of 37.

Subsequently the ratio of the blowing agent encapsulated in the expanded hollow microspheres was determined to be 16.3 weight percent. The expanded hollow microspheres did not burn when a source of ignition was brought close to them.

Comparative Example 4

Thermo-expansive microspheres were produced in the same manner as in Comparative Example 3 except that 7.0 g of dimethyl adipate in the oil phase was replaced by 12.7 g of dimethyl octafluoroadipate.

The resultant thermo-expansive microspheres had an average particle size of 18 μm with CV or coefficient of variation of 42% and a true specific gravity of 1.21, and the ratio of the blowing agent was 24.5 weight percent. The thermo-expansive microspheres did not burn when a source of ignition was brought close to them.

The microspheres were heated at 160° C. for 2 minutes in the same manner as in Example 1 to be processed into expanded hollow microspheres. The expanded hollow microspheres had an average particle size of 38 μm with CV or coefficient of variation of 41%, a true specific gravity of 0.172, and an expansion ratio of 7.

Subsequently the ratio of the blowing agent encapsulated in the expanded hollow microspheres was determined to be 16.3 weight percent. The expanded hollow microspheres did not burn when a source of ignition was brought close to them.

Example 4

Thermo-expansive microspheres were produced in the same manner as in Example 1 except that the oil phase was prepared by mixing 200 g of acrylonitrile, 75 g of methyl methacrylate, 1.2 g of ethyleneglycol dimethacrylate, 2.0 g of azobisisobutyronitrile, 100 g of methylperfluorobutyl ether, and 20 g of isobutane, and by agitating to dissolve those components.

The resultant thermo-expansive microspheres had an average particle size of 22 μm with CV or coefficient of variation of 25% and a true specific gravity of 1.16, and the ratio of the blowing agent was 28.9 weight percent. The thermo-expansive microspheres did not burn when a source of ignition was brought close to them.

The microspheres were heated at 140° C. for 2 minutes to be processed into expanded hollow microspheres. The expanded hollow microspheres had an average particle size of 88 μm with CV or coefficient of variation of 24%, a true specific gravity of 0.019, and an expansion ratio of 63.

Subsequently the ratio of the blowing agent encapsulated in the expanded hollow microspheres was determined to be 26.3 weight percent. The expanded hollow microspheres did not burn when a source of ignition was brought close to them.

Comparative Example 5

Thermo-expansive microspheres were produced in the same manner as in Example 4, except that 100 g of methylperfluorobutyl ether was replaced by 41.0 g of isohexane.

The resultant thermo-expansive microspheres had an average particle size of 21 μm with CV or coefficient of variation of 38% and a true specific gravity of 1.03, and the ratio of the blowing agent was 15.2 weight percent. The thermo-expansive microspheres inflamed when a source of ignition was brought close to them.

The microspheres were heated at 140° C. for 2 minutes in the same manner as in Example 4 to be processed into expanded hollow microspheres. The expanded hollow microspheres had an average particle size of 78 μm with CV or coefficient of variation of 39%, a true specific gravity of 0.021, and an expansion ratio of 49.

Subsequently the ratio of the blowing agent encapsulated in the expanded hollow microspheres was determined to be 11.3 weight percent. The expanded hollow microspheres inflamed when a source of ignition was brought close to them.

Example 5

Thermo-expansive microspheres were produced in the same manner as in Example 1 except that the oil phase was prepared by mixing 150 g of acrylonitrile, 120 g of vinylidene chloride, 5.0 g of methyl methacrylate, 0.8 g of trimethylolpropane trimethacrylate, 1.0 g of diisopropyl peroxidicarbonate, 90 g of methylperfluorobutyl ether, and 20 g of isobutane, and agitating to dissolve those components.

The resultant thermo-expansive microspheres had an average particle size of 15 μm with CV or coefficient of variation of 24% and a true specific gravity of 1.33, and the ratio of the blowing agent was 25.9 weight percent. The thermo-expansive microspheres did not burn when a source of ignition was brought close to them.

The resultant microspheres were heated at 120° C. for 2 minutes to be processed into expanded hollow microspheres. The expanded hollow microspheres had an average particle size of 63 μm with CV or coefficient of variation of 24%, a true specific gravity of 0.018, and an expansion ratio of 72.

Subsequently the ratio of the blowing agent encapsulated in the expanded hollow microspheres was determined to be 24.7 weight percent. The expanded hollow microspheres did not burn when a source of ignition was brought close to them.

Comparative Example 6

Thermo-expansive microspheres were produced in the same manner as in Example 3, except that 90 g of methylperfluorobutyl ether was replaced by 36.9 g of normal pentane.

The resultant thermo-expansive microspheres had an average particle size of 13 μm with CV or coefficient of variation of 38% and a true specific gravity of 1.26, and the ratio of the blowing agent was 14.2 weight percent. The thermo-expansive microspheres inflamed when a source of ignition was brought close to them.

The microspheres were heated at 120° C. for 2 minutes in the same manner as in Example 5 to be processed into expanded hollow microspheres. The expanded hollow microspheres had an average particle size of 46.4 μm with CV or coefficient of variation of 39%, a true specific gravity of 0.029, and an expansion ratio of 43.

Subsequently the ratio of the blowing agent encapsulated in the expanded hollow microspheres was determined to be 9.3 weight percent. The expanded hollow microspheres inflamed when a source of ignition was brought close to them.

Example 6

Two weight percent of the thermo-expansive microspheres produced in Example 1 was moistened with 2 weight percent of a process oil, mixed with 96 weight percent of SBS (styrene-butadiene-styrene block copolymer, having a specific gravity of 0.9), and knead with biaxial rolls at 80° C. to be processed into rubber sheet. Then the rubber sheet was heated at 160° C. for 10 minutes with a hot pressing device to be processed into foamed rubber sheet. The result is shown in Table 1.

Comparative Example 7

Foamed rubber sheet was produced in the same manner as in Example 6, except that the thermo-expansive microspheres produced in Example 1 was replaced by the thermo-expansive microspheres produced in Comparative Example 4. The result is shown in Table 1.

TABLE 1

| | Surface finish of foamed rubber sheet *1 | Specific gravity of foamed rubber sheet *2 |
|---|---|---|
| Example 6 | good | 0.53 |
| Comparative Example 7 | poor | 0.85 |

*1: The surface roughness of foamed rubber sheet was visually inspected.
*2: determined with a high-precision Electronic Densimeter (SD-200L, produced by Mirage Trading Co., Ltd.)

The thermo-expansive microspheres of the present invention have a narrow range of particle size distribution and superior expanding performance. Therefore the foamed rubber sheet produced with the thermo-expansive microspheres has good surface finish and light weight owing to the effective function of the thermo-expansive microspheres.

Example 7

Five weight percent of expanded hollow microspheres (with an average particle size of 120 μm, CV or coefficient of variation of 27%, and a true specific gravity of 0.020) produced by heating the thermo-expansive microspheres of Example 1 was mixed with 95 weight percent of a PVC-sol paint (with a specific gravity of 1.4), and painted on a substrate. Then the painted substrate was heated for gelling the mixed paint in a Perfect Oven at 160° C. for 30 minutes to process the coating into a sheet. The result is shown in Table 2.

Comparative Example 8

A sheet was produced in the same manner as in Example 7, except that expanded hollow microspheres (with an average particle size of 38 μm, CV or coefficient of variation of 41%, and a true specific gravity of 0.172) produced by heating the thermo-expansive microspheres of Comparative Example 4 instead of the thermo-expansive microspheres of Example 1 were employed. The result is shown in Table 2.

TABLE 2

| | Surface finish of PVC sheet *1 | Specific gravity of PVC sheet *2 |
|---|---|---|
| Example 7 | Good | 0.32 |
| Comparative Example 8 | Poor | 0.94 |

*1: The surface roughness of PVC sheet was visually inspected.
*2: determined with a high-precision Electronic Densimeter (SD-200L, produced by Mirage Trading Co., Ltd.)

Example 8

A balloon was filled with 50 g of expanded hollow microspheres (with an average particle size of 120 μm, CV or coefficient of variation of 27%, and a true specific gravity of 0.020) produced by expanding the thermo-expansive microspheres of Example 1, instead of the air, and was expanded to a volume of 4 liter. The balloon was stored at 50° C. for 1 month, but the volume did not decrease.

Example 9

The thermo-expansive microspheres produced in Example 1 and magnesium stearate having an average particle size of 2 μm and a melting point of 132° C. were mixed in 9:1 weight ratio and agitated uniformly with a Super Mixer (manufactured by Kawata MFG Co., Ltd.) to be processed into thermo-expansive microspheres having a surface coated with magnesium stearate. They had an average particle size of 30 μm with CV or coefficient of variation of 27%. The ratio of the encapsulated blowing agent was 30.7 weight percent.

Then the microspheres were heated at 160° C. for 2 minutes in the same manner as in Example 1 to be processed into expanded hollow microspheres. The expanded hollow microspheres had an average particle size of 113 μm with CV or coefficient of variation of 28%, a true specific gravity of 0.024, the ratio of the encapsulated blowing agent was 30.2 weight percent, and the fusion of the expanded hollow microspheres are not observed. The expanded hollow microspheres did not burn when a source of ignition, flame from a lighter, was brought close to them.

Example 10

Thermo-expansive microspheres and expanded hollow microspheres thereof having surface coated with acetylene black were produced in the same manner as in Example 9, except that the magnesium stearate was replaced by acetylene black having an average particle size of 42 nm. The resultant thermo-expansive microspheres had an average particle size of 30 μm with CV or coefficient of variation of 27%. The ratio of the encapsulated blowing agent was 30.6 weight percent.

The resultant expanded hollow microspheres had an average particle size of 118 μm with CV or coefficient of variation of 28%, and contained no fused microspheres. The resultant expanded hollow microspheres had a true specific gravity of 0.022, the ratio of the encapsulated blowing agent was 30.4 weight percent, and the fusion of the expanded hollow microspheres are not observed.

What is claimed is:

1. A production process for producing thermo-expansive microspheres, comprising the step of: polymerizing at least one polymerizable monomer in an aqueous suspension in the presence of a blowing agent,
   wherein said microspheres consist essentially of a shell of thermoplastic resin and said blowing agent, and have a CV, or coefficient of variation, of particle size distribution of 30% or less, and
   wherein said blowing agent is encapsulated in the shell, comprises a fluorine-containing $C_{2-10}$ compound having an ether linkage, is free of chlorine and bromine atoms, and gasifies at a temperature not higher than the softening point of said thermoplastic resin.

2. The process of claim 1, wherein the blowing agent further contains other compounds being different from said fluorine-containing compound.

3. The process of claim 1, further comprising a step of coating the surface of the thermo-expansive microspheres with 0.1 to 95 weight percent of a fine-particle coating agent having a primary particle size not greater than one tenth of the particle size of said thermo-expansive micropsheres.

4. The process of claim 1, further comprising a step of coating the surface of the thermo-expansive microspheres with 0.1 to 95 weight percent of a fine-particle coating agent, comprising at least one compound selected from the group consisting of organic compounds having a melting point of 90° C. or higher and inorganic compounds formed into layer lattice.

5. The process of claim 1, wherein the fluorine-containing $C_{2-10}$ compound comprises at least one member selected from the group consisting of $C_3F_7OCH_3$, $C_4F_9OCH_3$, $C_4F_9OC_2H_5$ and $C_7F_{15}OC_2H_5$.

6. The process of claim 3, wherein the fine-particle coating agent comprises at least one member selected from the group consisting of organic coating agents, and inorganic coating agents selected from the group consisting of silica, alumina, mica, talc, isinglass, calcium hydroxide, calcium phosphate, magnesium hydroxide, magnesium phosphate, barium sulfate, titanium dioxide, zinc oxide, ceramic beads, glass beads, crystal beads, carbon black, and molybdenum disulfide.

7. The process of claim 4, wherein the fine-particle coating agent comprises at least one member selected from the group consisting of organic coating agents, and inorganic coating agents selected from the group consisting of silica, alumina, mica, talc, isinglass, calcium hydroxide, calcium phosphate, magnesium hydroxide, magnesium phosphate, barium sulfate, titanium dioxide, zinc oxide, ceramic beads, glass beads, crystal beads, carbon black, and molybdenum disulfide.

8. A production process for producing thermo-expansive microspheres, comprising the step of: polymerizing at least one polymerizable monomer in an aqueous suspension in the presence of a blowing agent,
   wherein said microspheres consist essentially of a shell of thermoplastic resin and said blowing agent, and have a CV, or coefficient of variation, of particle size distribution of 30% or less, and
   wherein said blowing agent is encapsulated in the shell, consists essentially of a fluorine-containing $C_{2-10}$ compound having an ether linkage, is free of chlorine and bromine atoms, and gasifies at a temperature not higher than the softening point of said thermoplastic resin.

9. The process of claim 8, wherein the fluorine-containing $C_{2-10}$ compound comprises at least one member selected from the group consisting of $C_3F_7OCH_3$, $C_4F_9OCH_3$, $C_4F_9OC_2H_5$ and $C_7F_{15}OC_2H_5$.

10. The process of claim 8, further comprising a step of coating the surface of the thermo-expansive microspheres with 0.1 to 95 weight percent of a fine-particle coating agent having a primary particle size not greater than one tenth of the particle size of said thermo-expansive microspheres.

11. The process of claim 8, further comprising a step of coating the surface of the thermo-expansive microspheres with 0.1 to 95 weight percent of a fine-particle coating agent, comprising at least one compound selected from the group consisting of organic compounds having a melting point of 90° C. or higher and inorganic compounds formed into layer lattice.

12. The process of claim 10, wherein the fine-particle coating agent includes at least one member selected from the group consisting of organic coating agents, and inorganic coating agents selected from the group consisting of silica, alumina, mica, talc, isinglass, calcium hydroxide, calcium phosphate, magnesium hydroxide, magnesium phosphate, barium sulfate, titanium dioxide, zinc oxide, ceramic beads, glass beads, crystal beads, carbon black, and molybdenum disulfide.

13. The process of claim 11, wherein the fine-particle coating agent includes at least one member selected from the group consisting of organic coating agents, and inorganic coating agents selected from the group consisting of silica, alumina, mica, talc, isinglass, calcium hydroxide, calcium phosphate, magnesium hydroxide, magnesium phosphate, barium sulfate, titanium dioxide, zinc oxide, ceramic beads, glass beads, crystal beads, carbon black, and molybdenum disulfide.

14. A production process for producing thermo-expansive microspheres, comprising the steps of:

polymerizing at least one polymerizable monomer in an aqueous suspension in the presence of a blowing agent; and coating the surface of the thermo-expansive microspheres with 0.1 to 95 weight percent of a fine-particle coating agent having a primary particle size not greater than one tenth of the particle size of said thermo-expansive microspheres, wherein said microspheres consist essentially of a shell of thermoplastic resin and said blowing agent, and have a CV, or coefficient of variation, of particle size distribution of 30% or less, wherein said blowing agent is encapsulated in the shell, consists essentially of a fluorine-containing $C_{2-10}$ compound having ether linkage, is free of chlorine and bromine atoms, and gasifies at a temperature not higher than the softening point of said thermoplastic resin, wherein the fine-particle coating agent comprises at least one member selected from the group consisting of organic coating agents, and inorganic coating agents selected from the group consisting of silica, alumina, mica, talc, isinglass, calcium hydroxide, calcium phosphate, magnesium hydroxide, magnesium phosphate, barium sulfate, titanium dioxide, zinc oxide, ceramic beads, glass beads, crystal beads, carbon black, and molybdenum disulfide.

15. The process of claim 14, wherein the fluorine-containing $C_{2-10}$ compound includes at least one member selected from the group consisting of $C_3F_7OCH_3$, $C_4F_9OCH_3$, $C_4F_9OC_2H_5$ and $C_7F_{15}OC_2H_5$.

* * * * *